United States Patent [19]

Avocat

[11] 4,320,311
[45] Mar. 16, 1982

[54] COMBINATION ISOLATING SWITCH AND CURRENT TRANSFORMER

[75] Inventor: Jean P. Avocat, Lambres lez Douai, France

[73] Assignee: S.A. Douaisienne de Transformateurs Electriques de Mesure, Douai, France

[21] Appl. No.: 131,103

[22] Filed: Mar. 18, 1980

[30] Foreign Application Priority Data

Mar. 28, 1979 [FR] France ................................ 79 08412

[51] Int. Cl.³ ............................................ H02B 13/02
[52] U.S. Cl. ................................. 307/147; 200/48 A; 361/340
[58] Field of Search ................. 200/48 R, 48 A, 48 P; 361/338, 339, 340, 391; 307/149, 147

[56] References Cited

U.S. PATENT DOCUMENTS 3,157,827 11/1964 Tjebben ............................ 361/340
4,214,291 7/1980 Koshman et al. ................... 361/338

FOREIGN PATENT DOCUMENTS 2398 6/1978 European Pat. Off.

*Primary Examiner*—Joseph W. Hartary
*Assistant Examiner*—James L. Dwyer
*Attorney, Agent, or Firm*—Robert B. Frailey

[57] ABSTRACT

An isolating switch for use in a voltage cell connected to a source of power. The switch is disposed on a slidable frame mounted on guides internally of the cell. It includes a movable assembly mounted rotatably on the slidable frame, with capacity for pivotal movement from switch closing position to switch opening position. The movable assembly includes an oscillatable rotary cylinder formed of insulating material and pivotal about its longitudinal axis. A plurality of axially spaced, coplanar poles are formed integrally with the cylinder, each pole including a pair of coaxial diametral arms of unequal length extending from opposite sides of the cylinder. The arms encase a diametral conductive core provided with electrical contacts mounted at each end. The contacts are connectable to, and disconnectable from, the source of power and an adjacent circuit breaker, or similar apparatus, by turning the movable assembly angularly about its longitudinal axis. The conductive core of each pole may constitute a monoconductor primary of a current transformer disposed at each pole internally of the cylinder, the secondaries of the transformer being suitably located within the cylinder relative to the pole.

12 Claims, 11 Drawing Figures

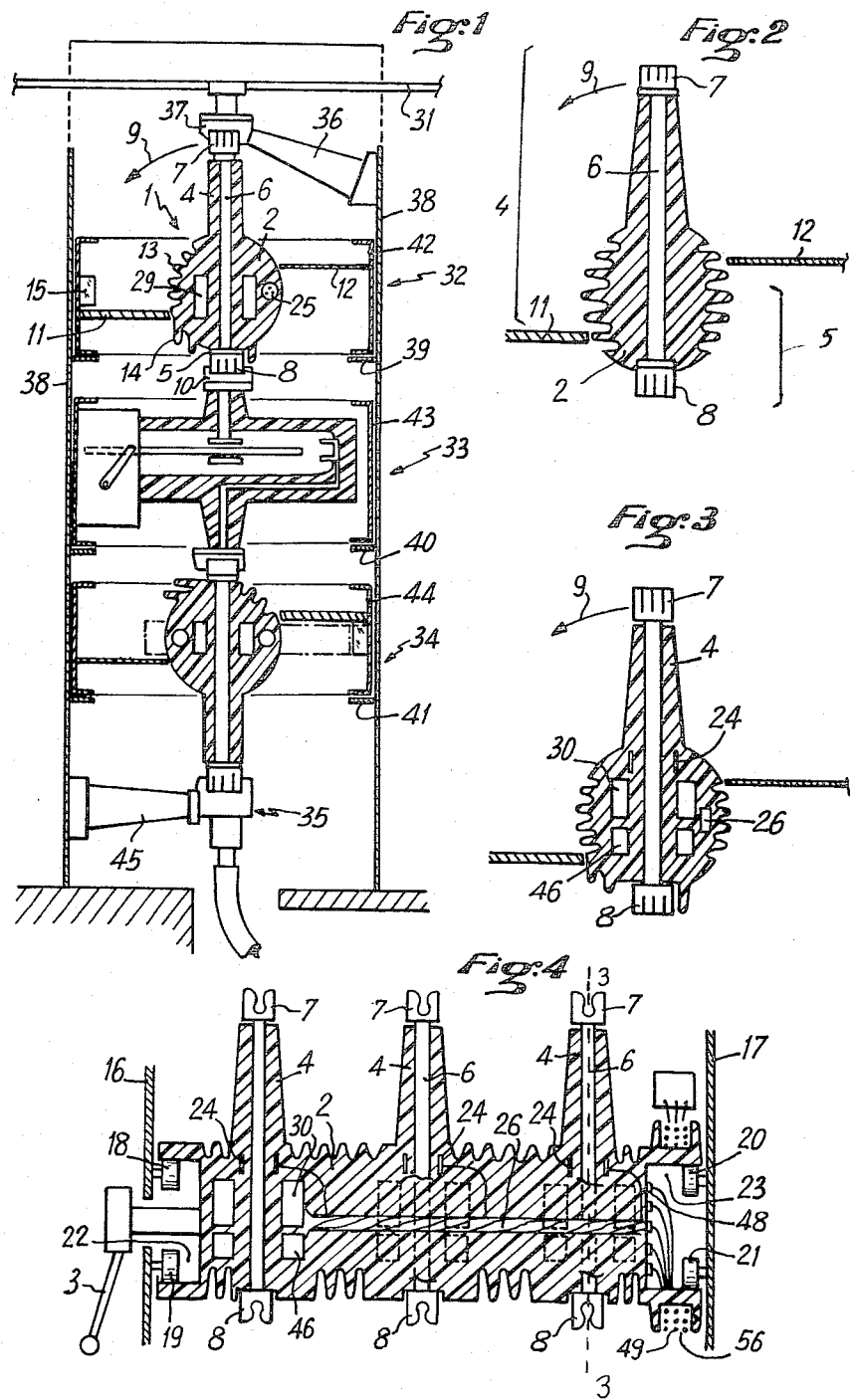

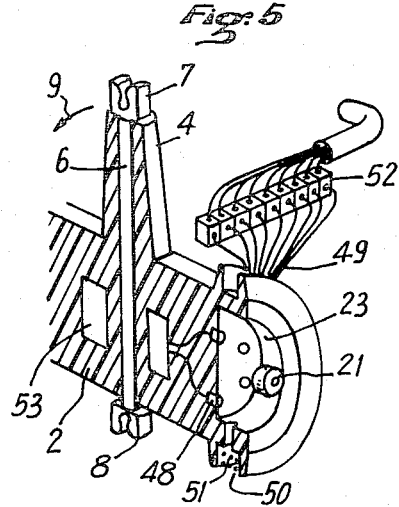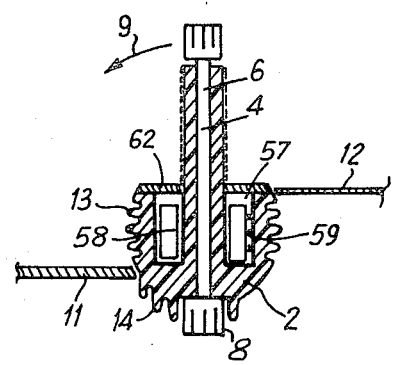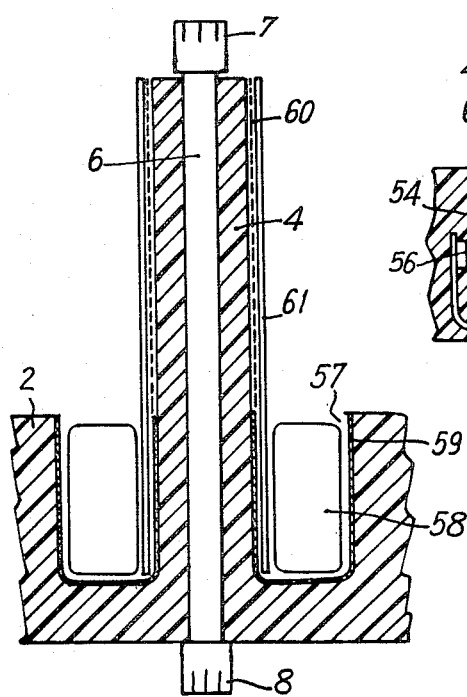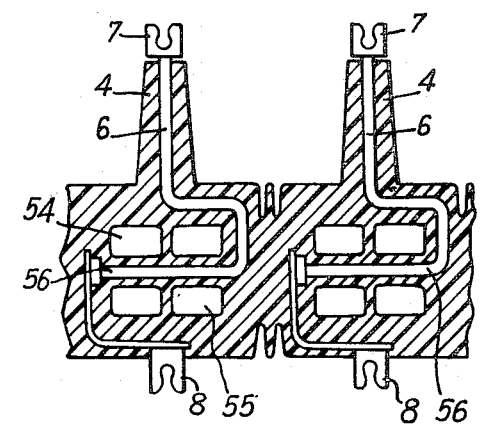

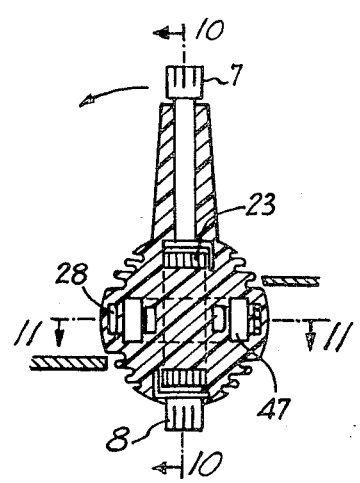
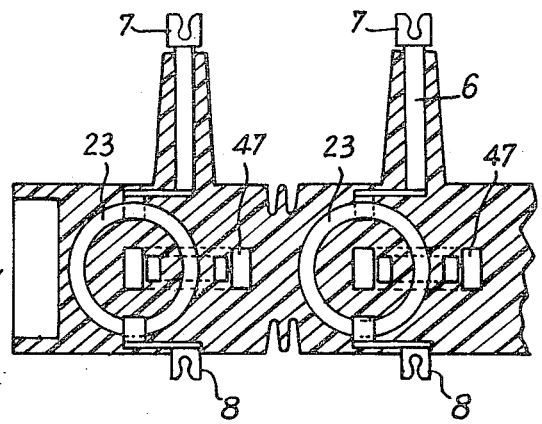
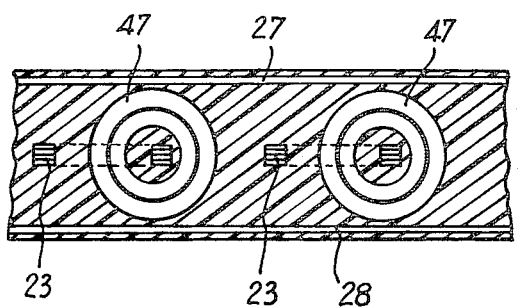

4,320,311

COMBINATION ISOLATING SWITCH AND CURRENT TRANSFORMER

FIELD OF TECHNOLOGY

The present invention is concerned with a movable isolating unit or switch, preferably in the form of a removable slide, which is inserted into a medium-voltage cell open at the front and forming a prismatic space, the said unit performing at least the function of disconnecting an adjacent circuit-breaker apparatus.

PROBLEM POSED AND THE STATE OF THE PRIOR ART

The constant efforts of builders of medium-voltage current distribution substations are directed towards industrializing their products not only by dividing them into juxtaposed modular cells, each cell connecting some type of apparatus to an output or input of current from or to the substation, but also by making the structure of an elementary cell likewise modular, such cell consisting of a superposition of standardized, extractable slides each connected to one or more work installations, such as a circuit breaker, isolating switch, current transformer or relay.

Frequently, in such installations, the arrangement is such as to make the circuit-breaker "removable": i.e., the circuit-breaker first must be able to be isolated from the set of bus-bars, or from the input cables, which remain at operating voltage (isolating-disconnection function), and then, generally by some suitable movement, the cell is cut out, whereby its terminals are automatically disconnected from the fixed conductors or cables by the separation of a combination of elastic clips and connection studs, while protective devices prevent incorrect manipulation and accidents to personnel (disconnection function).

If a construction having extractable slides is used, the circuit-breaker will be disposed in a slide, its terminals emerging from the top and from the bottom, respectively. Such a circuit-breaker slide will be disposed between two symmetrically placed slides, one above it and the other below it, each of these slides providing the isolating disconnection function described above,
the disconnection function described above,
possibly one or more current-transformer functions,
possibly a capacitive voltage-divider function for excitation of voltage indicators.

The invention which is the subject of French patent application No. 77 36 917 filed Nov. 30, 1977 in the name of Jacques Ridoux and of European patent application No. 78400163.8 filed Nov. 6, 1978, covers such a system of extractable subassemblies, making use, in particular, of the combination of a current transformer and an isolating switch with a rotary arm on the one hand, and of a circuit-breaker disposed either horizontally or vertically in an electronegative gas on the other hand. The current transformer is molded within an isolating unit located in the prismatic space of each elementary cell, dividing the said prismatic space into at least two spaces, constituting partitions impassable by solid, liquid or gaseous physical bodies,
by electric arcs emitting from uninsulated parts under voltage.

One of the faces of the operating or isolating unit comprises a unique arm of a rotary isolator or isolating switch connected to a terminal relative to the center of such face, the said arm turning about an axis parallel to the said face and perpendicular to the front of the unit, from which it can be actuated by a handle.

In the open position, where the arm is parallel to the face of the insulating unit, the end of the arm is engaged with a contact fixed to the wall of the prismatic space and connected to ground, thus grounding the apparatus connected to the terminal at the center of the face of the insulating unit.

The structure of the invention described above can be simplified considerably if it is possible to:

(1) limit the volume and the mass of the active parts of current transformers, particularly:
   (a) when low-consumption electronic protective devices are used,
   (b) when the nominal current is sufficiently high for the current transformer to be of the type having a monoconductor primary constituted by the bar of the isolating switch itself,
   (c) when the ratio of the permissible short-duration thermal overlead to the nominal current is low for a current transformer with a wound primary,
(2) avoid the necessity of grounding the circuit breaker, when it is not subjected to voltage, by means of the arm of the isolating switch when in its open position,
(3) allowing the isolating unit composed of the slide, current transformer and isolator not to constitute a partition which is rigorously impassable to solid, liquid or gaseous physical bodies, or arcs.

It is satisfactory if, in one or the other, or both, of the open and closed positions of the isolating switch (1) the conductors which remain under voltage on the other side of the isolating switch-current transformer slide cannot be reached by small diameter metallic wires when the circuit-breaker slide is retracted,
(2) a considerable mass of gas, for example ionized air, cannot rapidly spread from the compartment containing the circuit-breaker to the compartment containing the set of busbars, or even to the compartment containing the cables, and vice versa, to limit the risk of flash-over in the substation,
(3) electrical arcs cannot be created in the air from one compartment to the other below a prescribed voltage level.

The present invention comes within the above case; it constitutes a considerably simplified modification of it, and hence is much more economical.

SUMMARY OF THE INVENTION

The invention principally is characterized by the combination of:

(1) a frame which slides horizontally on guides within the cell,
(2) a movable assembly which pivots about an axis supported by the frame and composed:
   of a central cylinder of insulating material, substantially circular in cross section, capable of turning about its axis, which is perpendicular to the front of the frame, and controlled by a front handle located outside the frame so as to be able to oscillate between two extreme positions with an amplitude of a quarter-turn,
   of isolating switch poles, each composed of a pair of coaxial arms incorporating a conductive core, integral with the cylinder and passing diametrically through it, the core having at each end electrical latching contacts or clips which connect, during the rotation of the movable assembly, with corresponding contacts of the cell upon closing, and of the slidable frame upon opening, the arms of each pole being formed on each side of the cylinder and being of unequal length, the conductive cores of the poles being located in the same plane passing through the axis of the cylinder, the longer arms cooperating with the fixed contacts of the cell when in their vertical position, and with other contacts on the frame when in their horizontal position, to ensure the "isolating switch" function in the open position; the other arms, being as short as is permitted by the requirements for insulation from ground and between the poles, cooperating in the closed position with the corresponding contacts of the adjacent circuit-breaking apparatus to provide connection, as far as the voltage of the network requires it, the arms being covered with an insulating material up to the connecting clips or contacts located at their distal ends, (3) screens fixed to the frame and offset on either side of the horizontal diametral place of the cylinder, one a conductor in the vicinity of the long arms, the other, insulating, in the vicinity of the short arms, the distal edges of the said screens coming as close as possible to the cylinder, the offset of the two screens being a distance at least equal to the vertical space occupied by the arms when in their horizontal position, (4) contacts on the frame, connected to ground, cooperating with the latching contacts at the ends of the long arms when the latter are in the horizontal position, i.e. in the open position of the isolating switch.

Alignment of the movable assembly during its rotation is accomplished, at least one of the ends of the said assembly, by supporting the cylinder on three rollers having axes parallel to the axis of the cylinder and affixed to the adjacent front or rear wall of the frame. The rollers may turn on the outside surface of the cylinder, but it is preferable to have them turn within a bore or recess formed at the end of the cylinder and concentric with it.

One of the essential characteristics of the invention resides in the fact that current transformers may be provided in cooperation with the core of at least one pole of the movable assembly, the said transformers being disposed within the cylinder together with the outputs of their secondary windings. The latter terminate at movable terminals which are integral with the movable assembly and which are connected to terminals fixed to the slidable frame by appropriate flexible connections composed of a bundle of flexible wires wound into a spiral and located within a circular groove formed in and concentric with the cylinder. The bundle of wires passes through a hole in the bottom of the groove, one end being connected to the movable terminals while the other end of the bundle is connected to the fixed terminals of the frame.

In a first embodiment, the current transformer is of the type having a monoconductor primary disposed within each pole and at least one magnetic circuit comprising a core about which is wound a secondary winding, the said magnetic core being disposed around the conductive core and within the central cylinder.

In the second embodiment, a current transformer is located at each pole internally of the central cylinder, and includes a primary winding of several turns disposed between the conductor arms of each pole and one or more magnetic cores through which the pole extends.

In the case of a transformer with a monoconductor primary, it sometimes will be advantageous to provide the conductive core with an elbowed profile having a median part or portion which is concentric with the central cylinder and about which the magnetic cores are disposed.

In a modification of the second embodiment, in which the current transformers are located within the central cylinder, one or more magnetic cores, following molding, are placed about the insulation covered long arm which surrounds the conductor core of each pole, and are located within an annular cavity formed in the central cylinder. Channels or grooves are provided in order to accommodate the wires extending between the transformer windings and terminals located at the end of the cylinder.

However, the construction which has just been described is not exclusive. The insulating material of the movable assembly may be arranged to encapsulate the conductor cores, the primary windings and the magnetic cores of the various poles, the magnetic cores being sustained, during casting, by supports which provide the channels for the wires extending from the magnetic cores to the outer terminals.

In the modification in which the magnetic cores of the current transformers, after molding, are slipped onto the insulated long arm, the cavities containing the magnetic circuits and their windings may be lined with a conductive covering connected to ground, while means are provided for avoiding the formation of electrical brush discharges at the exterior of the movable assembly between the contacts at the ends of the poles and the conductive covering to ground, namely:

(1) on the long arm, a semiconductor covering providing a linear distribution of voltage constituted by a semiconductive grease confined by a heat-shrinkable tubular sheath, (2) on the cylinder and the small arm, corrugations which extend the distances traveled by any sparks, but having a form which does not obstruct the rotation of the cylinder with respect to the corresponding screen.

There may be provided, in any suitable manner, a capacitive divider at each pole, molded within the mass of insulating material of the cylinder and constituted by a tubular conductive screen concentric with the central core of the pair of arms, the said screen being electrically connected to a conductor embedded in the cylinder and extending to a terminal at one end of the latter.

By means of the invention, the apparatus of the prior art is simplified considerably, while results nevertheless are obtained which are very close to those of the original device envisaged in the French and the European patent applications cited above. The solution may be less perfect, but it is fully sufficient in the majority of cases, permitting economy in the materials utilized and a reduction in the number of high current movable contacts.

The invention will be better understood with the aid of the following description, which provides several non-limiting examples of practical embodiments thereof, which are illustrated by the attached drawings.

BRIEF DESCRIPTION OF THE FIGURES OF THE DRAWING

In these drawings:

FIG. 1 is a schematic view, in transverse vertical section, of a cell embodying the invention, in which two movable isolating units according to the invention flank a known movable circuit breaker.

FIG. 2 is a transverse vertical section of a first embodiment of a movable assembly according to the invention.

FIG. 3 is a transverse vertical section of a second embodiment of a movable assembly according to the invention, taken along section line 3—3 of FIG. 4.

FIG. 4 is a longitudinal section of a tripolar movable assembly constituting the second embodiment of the invention.

FIG. 5 is a fragmentary view in perspective of the sectioned right end of the movable assembly shown in FIG. 4.

FIG. 6 is a transverse vertical section of a third embodiment of a movable assembly according to the invention.

FIG. 7 is an enlarged fragmentary section of the movable assembly shown in FIG. 6.

FIG. 8 is a fragmentary longitudinal section of a fourth embodiment of a movable assembly according to the invention.

FIG. 9 is a transverse vertical section of a fifth embodiment of a movable assembly according to the invention; this embodiment possessing a current transformer intercalated between two sections of the core of a pair of arms.

FIG. 10 is a longitudinal section taken along section line 10—10 of FIG. 9.

FIG. 11 is a horizontal section taken along section line 11—11 of FIG. 9.

DETAILED DESCRIPTION OF THE INVENTION

The cell shown in FIG. 1 communicates with one phase of a set of bus-bars 31 supported by an insulator 36, the upper end of which has a fixed contact blade 37 which cooperates, as will soon be seen, with the movable isolating unit or removable slide 32 operating as an isolating switch-current transformer which is the object of the invention. The movable unit 32 serves to disconnect or to connect electrically the contact blade 37, which is affixed to one of the bus-bars of the set 31, to a circuit-breaker 33 of the type which has been described in the French patent application Ser. No. 77 36 917 cited above.

The circuit-breaker 33, in turn, is connected to the end of the cable 35, or may be disconnected from it, at will, by means of an operating unit 34 similar to the operating unit 32.

The cell may be a medium voltage cell open at its front and occupying a prismatic space. It is generally metallic and connected to ground, and includes vertical side walls 38 and horizontal guides, such as guides 39, 40, 41, on which slide the frames 42, 43, 44 of the isolating units with which the previously cited patent applications are concerned. The cable end 35 is held by an insulating support 45 fixed to one side wall 38 of the cell.

The invention concerns the structure of the movable isolating units or removable slides 32 and 34 which will now be described in more detail.

The operating units of the cell, such as units 32 or 34, essentially comprise an oscillatable rotary assembly 1 composed of a beam or central cylinder 2 of insulating material, turnable about its axis because it is supported at each end on bearings. The axis of the beam 2 is perpendicular to the front of the frames 42 or 44 and the rotation of the beam or cylinder 2 is effected by means of a handle 3 (FIG. 4). Extending diametrically of the beam or cylinder 2 are the coaxial isolator arms 4, 5 which incorporate a central conductive core 6 which, in turn, is terminated, at the distal ends of the arms 4, 5 by electrical latching clips or contacts 7, 8, respectively. Preferably, there are three pairs of arms 4, 5, each of which communicate with one bus-bar of the set 31, since in general a three-phase current is provided. Each pole of the movable assembly 1 includes a long arm 4 and a short arm 5 containing a central conductor or core 6, both arms being coated with insulating material. Of course, the number of poles is totally independent of the invention. As shown, the arm 4 is much longer than the arm 5, and all the arms and cores are situated in the same plane passing through the axis of the movable assembly 1. The length of the arms 5 depends on the isolation distance.

During the rotation of the assembly 1 in the direction of the arrow 9, the long arm 4 carries out the isolating-disconnecting switch function, while the diametrically opposed short arm 5, coated with insulating material over a length which is as reduced as possible, taking into account the requirement for dielectric integrity with respect to ground and to the neighboring pole, ensures the disconnection of the associated circuit-breaker 33. The upper free end of the central core 6 within the large arm 4 carries a latching clip 7 with elastic contacts which, in the closed position, press the contact blade 37, or the connection studs of the fixed contact blade 37, affixed to one of the bus-bars of the set 31. The other free end of the central core 6, at the end of the small arm 5, carries a latching clip 8 to clamp the connection studs 10 of the corresponding terminal of the circuit-breaker 33. The clips 7, 8 thus are displaced, during the rotation of the oscillatable rotary assembly 1, in a plane perpendicular to the axis of the beam or central cylinder 2. The amplitude of rotation of the rotary assembly 1 is a quarter of a turn, between the vertical position of the arms 4, 5 (to ensure the electrical contacts) and their horizontal position (to ensure isolation).

There are furthermore provided screens or partitions 11, 12 fixed to the slidable frame 42 and offset to either side of the horizontal diameter plane of the cylinder 2. The off-set is of an amount at least equal to the vertical space occupied by the arms 4 and 5 in their horizontal position to ensure there is no disturbance of the horizontal positioning of the arms 4 and 5. The outer edges of the screens 11 and 12 are fixed to the frame 42, while their inner distal edges come as close as possible to the cylinder 2. For reasons of economy, the screens 11 and 12 could both be metallic. It is preferred, however, to construct the screen 11, that is, the one closer to the latching clip 8 and the connection stud 10, of insulating material. For the same purpose of insulation, baffles or corrugations 13, 14 are molded along the generatrices of the beam 2 in order to prevent the passage of metallic wire and to impede mass gaseous displacement on both sides of the partition 11.

The frame 42 also has a contact blade 15 onto which the contact clip 7 at the end of the arm 4 is latched when the arm is horizontal, that is, in the open position of the isolator, in order to ground the central core 6 via the clip 7, the contact 15, the frame 42 and the wall 38.

The beam 2 has a relatively substantial diameter. As shown in FIG. 4, it is supported pivotally at its two ends by bearings formed in the front wall 16 and back wall 17 of the frames 42 or 44. The bearings at each end may consist of three rollers, such as rollers 18, 19, 20, 21, the spindles of which are parallel to the axis of cylinder 2 and are fixed to the front wall 16 and the back wall 17, respectively. The rollers could bear on the outer periphery of the beam 2 but, as shown in FIGS. 4 and 5, it is preferred that the rollers be disposed within circular recessed 22, 23 formed on each end of the cylinder 2, the said recesses 22 and 23 being concentric with the cylinder.

The relatively large diameter of the beam or cylinder 2 enables all kinds of apparatus to be mounted there, as now will be explained. In the first place, there can be mounted on beam 2 one or more current transformers with a monoconductor primary (FIGS. 1, 2, 3, 4, 5, 6, 7, 8) constituted by the central conductive core or conductor 6 of the corresponding pole. There also can be mounted three wound primaries 23 (FIGS. 9, 10, 11), each of them having one or more magnetic cores, within the possible space limits.

Each pole also can include a capacitor plate 24 (FIGS. 3 and 4A) at a potential near ground, serving as a capacitive divider for the indication of the presence of voltage or for any other purpose which is considered useful. The plate 24 preferably is constituted by a latticed cylinder coaxial with the core 6.

The low voltage wiring 25, 26 (FIGS. 1, 3, 4) and 27, 28 (FIG. 9, 11) coming from the secondaries 29, 30, 46, 47 of the current transformers or from the capacitive dividers 24 passes through conduits or channels having a grounded conductive sheath. The conduits are disposed parallel to the axis of the central beam or cylinder 2, and extend to the back of the slidable frames 42, 44 to end in studs or terminals 48 (FIGS. 4, 5), the whole being embedded in the insulating mass of the movable beam 2. Connected externally to the studs or terminals 48 are the ends of flexible insulated wires 49 twisted into a spirally wound bundle within a cylindrical groove 50 formed concentrically of the cylinder 2. The wires 49 pass through a hole 51 in the bottom of the groove 50 to connect to the stationary terminals 52 fixed to the frames 42, 44.

The current transformers themselves may be constituted in several ways. In a first instance (FIGS. 1, 3, 4, 5, 8, 9, 10, 11), the cylinder or beam 2 is molded by simultaneously embedding or encapsulating a toroidal magnetic core or secondary 29, 30, 46, 47, 53, 54, 55 coaxially of the conductor or central conductive core 6 of each pole of the oscillatable rotary assembly 1. In such case, the central conductive core comprises a monoconductor primary.

In the embodiment of FIGS. 9 to 11, there is a primary winding of several turns 23 which cooperates with a secondary core 47 passing through the primary 23 in a plane perpendicular to the latter. The assembly also is embedded in an insulating material.

In the embodiment of FIG. 8, the central conductive primary core 6 has been made to follow a path with an elbowed profile, with a median part 56 concentric with the cylinder 2 and around which are disposed secondary cores 54, 55, the assembly again being encapsulated in insulating material. The insulation preferably, but not exclusively, is constructed by casting the insulating material.

The technique of casting is known per se, but it sometimes is necessary to support certain pieces during casting of the plastic material. Thus, the central conductive cores 6 are held in the mold at their two ends. The secondaries 29, 30, 46, or 47, or 54, 55, are held by the metallic channels serving as conduits for the low-voltage wiring 25, 26, 27, 28.

Another technique consists of molding beforehand (FIGS. 6 and 7) the beam or central cylinder 2 with corrugations or baffles 13, 14 together with its conductive cores 6, leaving a cavity 57 concentric with the arm 4. One or more secondary cores 58 then are slipped onto the arm 4 in which the central core 6 is located to place the cores in the cavity 57. The core 58 is suitably maintained within the cavity 57 by an annular cover 62. The cavity 57 is lined beforehand with a conductive covering 59 connected to ground. This arrangement risks the possibility of creating brush discharges between the lining 59 and the latching clip 7. To prevent this, there is provided along the arm 4 a semiconductor covering 60 (FIG. 7), which preferably is a semiconductive grease locked in place by a heat-shrinkable tubular sheath 61. This technique already is known. It has the advantage of ensuring a suitable configuration of the electric field in the air in the vicinity of the path of travel of the arm 4 of the isolating switch. The semiconductor coating 60, composed of a grease containing conductive elements, ensures the linear distribution of voltage along the leakage line between the conductive lining 59, which is grounded, and the latching clip 7. The phenomenon of ionization along the sides of the long arm 4 thus is avoided.

There also is another phenomenon which could occur at the side of the arm 5. It is known that a certain isolating distance should be ensured on the surface of the insulating parts. This distance sometimes needs to be lengthened when the parts are subject to being covered with dust, to prevent the formation of sparks. This technique is widely known for insulators where corrugations are formed.

To avoid the formation of sparks from the latching clip 8, the more so to maintain a reduced height for the frames 42 or 44, which is on the order of the diameter of the cylinder 2, and in order to be able to reduce at the same time the length of the disconnection arm 5, while still ensuring sufficient electrical insulation relative to ground, it is necessary to provide corrugations such as 13 or 14, molded in the direction of the axis of the beam. The corrugations 13, 14, however, must be suitably confined within the trajectory of the various parts during rotation of the beam 2, i.e., their ends must not strike the screen or partition 11 during rotation.

I claim:

1. An isolating switch for use in a voltage cell having fixed electrical contact means connected to a source of power, said isolating switch providing at least the isolating switch function and the disconnection function for an adjacent circuit breaker apparatus, characterized by the combination of
   (a) at least one frame mounted slidably internally of the cell, said slidable frame having a fixed electrical contact means connected to ground,
   (b) a movable assembly mounted rotatably on the slidable frame with capacity for pivotal movement, said movable assembly comprising
      (i) an oscillatable rotary cylinder formed of insulating material and pivotal about its longitudinal axis, (ii) a handle connected to the cylinder for turning the cylinder through an amplitude of a quarter of a turn, (iii) a plurality of axially spaced co-planar isolating switch poles formed integrally with the cylinder and extending diametrically through the cylinder, each said pole including a pair of co-axial insulation-covered conductor arms containing a diametral conductive core, said arms extending from opposite sides of the cylinder and being of unequal length, (iv) contact means disposed at the outer ends of the longer conductor arms, said contact means being connectable with the fixed contact means of the cell when the isolating switch is in the closed position and being connectable with the fixed contact means of the slidable frame when the isolating switch is in the open position, and (v) contact means disposed at the outer ends of the shorter conductor arms, said contact means being connectable with the adjacent circuit breaker apparatus when the isolating switch is in the closed position aforesaid, (vi) said long arm and short arm contact means at each pole being connected by the diametral conductive core at each pole, and (c) screens affixed to the slidable frame on opposite sides of the movable assembly and extending in the direction of the cylinder to come as close as possible to the cylinder without touching it, one screen being conductive and the other screen being insulating, said two screens being offset relative to the axis of the cylinder to provide a distance between the screens not less than the space occupied by the arms when the isolating switch is in the open position aforesaid.

2. The isolating switch as defined in claim 1 wherein (a) the cell is a vertical cell of medium voltage open at the top and occupying a prismatic space, (b) the frame is slidable horizontally on guides disposed internally of the cell, (c) the slidable frame is provided with a front wall and a back wall, the longitudinal axis of the cylinder being disposed perpendicularly to at least the front wall of the frame, (d) the movable assembly is pivotal through an amplitude of a quarter of a turn from the closed switch position, with the long arms in a vertical position, to the open switch position, with the long arms in horizontal position, to carry out the isolating switch function, (e) the short arms are as short as permissible consistent with the requirements for insulation from ground and between poles, said short arms being disposed in a horizontal position when the movable assembly is in the open switch position, to carry out the disconnection function, and (f) the conductive screen is located in the vicinity of the long arms while the insulating screen is located in the vicinity of the short arms.

3. An isolating switch as defined in claim 1, characterized by the fact that the movable assembly is supported rotatably on the slidable frame by a plurality of rollers affixed to the frame adjacent to at least one end of said assembly, said rollers having axes parallel to the axis of the cylinder.

4. An isolating switch as defined in claim 3, characterized by the fact that the support rollers for the movable assembly are disposed within the interior of a recess formed internally of one end of the cylinder, said recess being concentric with the cylinder.

5. An isolating switch as defined in claim 1, characterized by (a) at least one current transformer located within the cylinder in association with the conductive core of at least one pole, (b) said transformer having secondary windings the outputs of which extend internally of the cylinder to connect to terminals affixed to the cylinder and movable therewith, (c) a plurality of terminals affixed to the slidable frame, (d) a plurality of flexible wires connecting the movable terminals on the cylinder to the fixed terminals on the frame, (e) said wires extending from the cylinder terminals into an annular groove formed concentrically in the cylinder and then through a hole in the bottom of the groove to connect to the terminals on the slidable frame.

6. An isolating switch as defined in claim 5, characterized by the fact that the current transformer is of the type having a primary monoconductor and at last one core comprising a magnetic circuit about which is wound a secondary winding, the magnetic core being disposed around the primary monoconductor internally of the cylinder, the said primary monoconductor being constituted by one of the diametral conductive cores of the poles.

7. An isolating switch as defined in claim 6, characterized by the fact that the conductive core is provided with an elbowed profile with a median part of said core being concentric with the cylinder, said magnetic core being disposed around said median part.

8. An isolating switch as defined in claim 5, characterized by the fact that a current transformer is located at each pole internally of the cylinder, each transformer including a primary winding of several turns located between the conductor arms of its pole and traversing perpendicularly one or more magnetic cores.

9. An isolating switch as defined in claim 6 or 8, characterized by the fact that the insulating material of the movable assembly encapsulates the primaries and the magnetic cores of each pole, the magnetic cores being supported, at the time of casting of the insulating material, by support means constituting channel conduits for the connecting wires extending from the magnetic cores to the cylinder terminals.

10. An isolating switch as defined in claim 6, characterized by the fact that, following molding of the cylinder, the magnetic core of the current transformer is impaled on the longer conductor arm and disposed within a cavity formed in the cylinder, said longer arm being coated with an insulating material, and a channel is provided for conducting connecting wires between the windings of the transformer and the cylinder terminals.

11. An isolating switch as defined in claim 10, further including (a) a conductive lining connected to ground disposed within the cavity containing the magnetic core and its windings and (b) means for avoiding the formation of electrical brush discharges externally of the movable assembly between the contact at the end of the pole and the grounded conductive lining comprising (i) a semiconductor coating constituted by a layer of semiconductive grease formed into a coating on the long arm by a heat-shrinkable tubular sheath to provide a linear distribution of voltage on the arm, and (ii) corrugations disposed on the cylinder and on the small arms to extend, as necessary, the distances traveled by any possible sparks, said corrugation having a shape which does not interfere with the rotation of the cylinder with respect to the screens.

12. An isolating switch as defined in claim 1, characterized by the fact that a capacitive divider is provided at each pole, molded within the mass of the insulating material of the cylinder and composed of a tubular conductive screen concentric with the conductive core extending through the pair of coaxial conductor arms, said conductive screen being connected electrically to a conductor imbedded in the cylinder and terminating at terminals located at one end of the cylinder.

* * * * *